United States Patent [19]

Kiffmeyer

[11] Patent Number: 4,825,752

[45] Date of Patent: May 2, 1989

[54] END-OF-STROKE BYPASS VALVE IN PISTON FOR IMPACT RELIEF IN HYDRAULIC TILT AND TRIM CYLINDER

[75] Inventor: Vernon A. Kiffmeyer, Hennepen City, Minn.

[73] Assignee: Commercial Shearing, Inc., Youngstown, Ohio

[21] Appl. No.: 133,137

[22] Filed: Dec. 14, 1987

[51] Int. Cl.⁴ ........................ F15B 15/22; F16K 15/18

[52] U.S. Cl. ........................................ 91/422; 91/419

[58] Field of Search ................... 91/49, 222, 422, 224, 91/229, 400, 399, 401, 437, 419, 445; 92/163, 164, 183, 184; 440/61

[56] References Cited

U.S. PATENT DOCUMENTS

| | | | |
|---|---|---|---|
| 591,137 | 10/1898 | Miles . | |
| 2,783,744 | 3/1957 | Tennis | 121/46 |
| 3,059,622 | 10/1962 | Sexauer | 121/38 |
| 3,093,117 | 6/1963 | Brown | 92/163 X |
| 3,174,410 | 3/1965 | Booth et al. | 91/419 X |
| 3,240,008 | 3/1966 | McMullen | 91/401 X |
| 3,250,073 | 5/1966 | Ellis, Jr. | 60/52 |
| 3,272,132 | 9/1966 | Stoelting et al. | 92/164 X |
| 3,311,026 | 3/1967 | Crisp | 91/401 X |
| 3,361,036 | 1/1968 | Harvey et al. | 91/224 |
| 3,450,006 | 6/1969 | White | 91/401 |
| 3,543,643 | 12/1970 | Southwell | 91/401 |
| 3,654,834 | 4/1972 | Sifri et al. | 91/399 |
| 3,962,955 | 6/1976 | Borst et al. | 91/401 |
| 4,308,018 | 12/1981 | Nakamura et al. | 91/401 X |
| 4,363,629 | 12/1982 | Hall et al. | 91/422 X |
| 4,391,592 | 7/1983 | Hundertmark | 440/61 |
| 4,449,470 | 5/1984 | Rump | 91/445 X |
| 4,490,120 | 12/1984 | Hundertmark | 91/401 X |
| 4,509,409 | 4/1985 | Reeves | 92/80 |
| 4,687,449 | 8/1987 | Fenrich | 91/399 X |
| 4,729,283 | 3/1988 | Hillier | 91/401 X |

FOREIGN PATENT DOCUMENTS

| | | | |
|---|---|---|---|
| 852111 | 10/1960 | United Kingdom | 91/419 |

*Primary Examiner*—Robert E. Garrett
*Assistant Examiner*—George Kapsalas
*Attorney, Agent, or Firm*—Thomas R. Shaffer

[57] ABSTRACT

An impact relief valve and apparatus is disclosed which includes a hydraulic pump connected by two feed lines to a hydraulic cylinder. A first feed line provides fluid below a piston of the cylinder and the second feed line provides fluid above the piston providing a means to cause reciprocal motion of the piston within a cylinder housing. The piston is provided with at least one impact relief valve adapted to be opened upon impact of the piston with the housing at the top of the stroke of the piston whereby when fluid from the first feed line pushes the piston to the top of its stroke, the impact valve or valves are caused to open allowing any additional fluid pressure from the first line to pass through the second feed line to a suction side of the pump thereby reducing power requirements for the pump. An annular ridge on the cylinder head opens the impact relief valves.

5 Claims, 1 Drawing Sheet

END-OF-STROKE BYPASS VALVE IN PISTON FOR IMPACT RELIEF IN HYDRAULIC TILT AND TRIM CYLINDER

BACKGROUND OF THE INVENTION

1. FIELD OF INVENTION

The present invention relates to impact relief valves and particularly to impact relief valves which are used in a tilt and trim hydraulic cylinder.

2. DESCRIPTION OF THE PRIOR ART

The provision of a relief valve in a piston is known in the art. For example, U.S. Pat. No. 3,250,073, discloses the provision of a spring loaded ball valve in the piston which is opened upon contact with a stud member. Further U.S. Pat. No. 4,391,592 discloses the provision of a relief valve in a hydraulic trim-tilt system for an outboard motor. While each of these patents teach the general concept of providing the relief valve in a piston element, they are structurally different from the system proposed by applicant.

SUMMARY OF THE INVENTION

The present invention relates to impact relief valve and apparatus which has particular utility in a hydraulic tilt and trim system but which may be used with other hydraulic systems.

The present invention incorporates one or more impact relief valves in the piston of a hydraulic cylinder with an annular ridge provided in the cylinder head positioned to open the relief valves when the piston is pushed against the cylinder head. A hydraulic pump means having first and second feed lines and a fluid reservoir is utilized to provide hydraulic fluid to the hydraulic cylinder. Check valve means may be provided in the pump feed lines. The check valve means include a shuttle piston and a first and second check valve to allow fluid to selectively flow from one of the first and second pump feed lines to a corresponding one of a first and second check valve means feed lines.

The hydraulic cylinder means of the present invention is connected to the first and second pump feed lines check valve means and includes an outer housing including a cylinder head provided at one end thereof. An annular cylinder liner is positioned within the housing to create an annular space between the liner and the housing. This annular space provides a passageway into the interior of the liner at a location adjacent the cylinder head. A piston means having a piston head provided within the liner and an attached piston rod extending through the cylinder head is also provided. The piston means is adapted for reciprocal motion within the liner and the piston head has at least one impact valve therein to provide the passageway through the piston head when the impact relief valve is in an open position. The cylinder head has an annular ridge positioned to contact and open one or more impact relief valves when the piston head reaches the top of its stroke and is adjacent the cylinder head. The cylinder housing has a first opening therethrough providing a passageway into the liner at an end opposite the cylinder head. Further, the cylinder has a second opening therethrough to provide access to the passageway adjacent said cylinder head. The first pump feed line is connected to the first opening in the housing and the second pump feed line is connected to the second opening. The system operates whereby when fluid from the first line pushes the piston means to the top of its stroke, the one or more impact relief valves are caused to open allowing any additional pressure from the first line to pass through the second line back to the pump to act as supply oil.

One of the benefits of the present invention is that a separate relief valve is not required in the first pump feed line. A relief valve is preferably provided, however, in the second pump feed line. By removing the need for a relief valve in the first pump fed line and by unloading excess fluid pressure in the cylinder to the suction side of the pump, the present invention provides a reduction of critical energy required to operate the pump when the cylinder is at the top of its stroke in a full tilt position.

Additionally by utilizing a cylinder head having an annular ride, it is possible to place a plurality of impact valves in a circular pattern within the piston head. By providing a plurality of such valves, and/or by providing relief valves which are fairly large, there will not be a reduced flow which might cause increased power requirements for the pump. Moreover, because the impact relief valve or valves are provided in the piston, there is no possibility that such relief valves will be open except when the piston is topped out.

Various other objects and purposes of the present invention will be apparent from the following description and the accompanying drawing in which:

DETAILED DESCRIPTION OF THE PREFERRED EMBODIMENT

Figure 1:
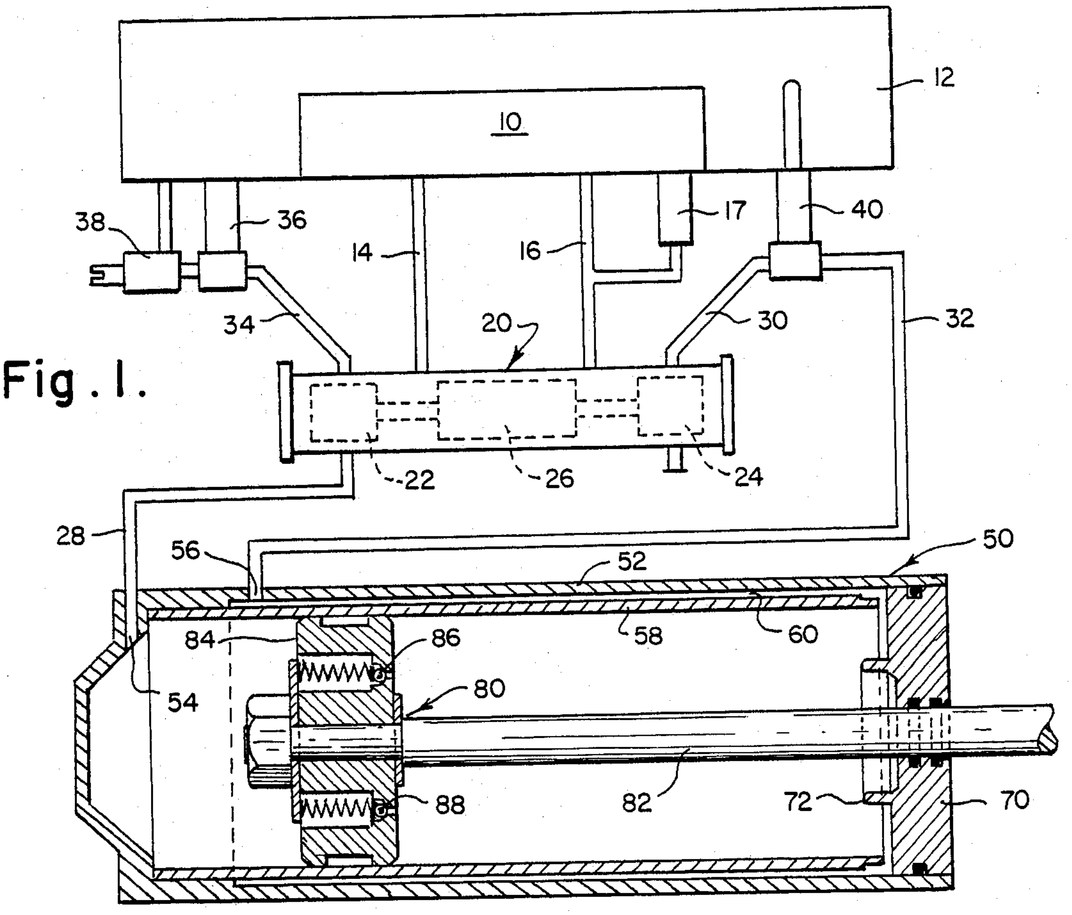
FIG. 1 is a schematic view of the impact relief valve and apparatus according to the present invention including a check valve means.

Referring to FIG. 1, the pump 10 having a reservoir 12 is provided. The first pump feed line 14 and second pump feed line 16 allow fluid to pass from the pump to check valve means 20.

Check valve means 20 includes a first check valve 22, a second check valve 24, and a shuttle piston member 26 which allows fluid to flow through check valve means 20 from only one of the pump feed lines 14 and 16. A relief valve 17 is provided in feed line 16. For reasons which will become apparent, no corresponding relief valve is required in feed line 14. Feed line 34 is attached to check valve 22 to provide a passageway to a manual release valve 38. A thermal relief valve 36 is preferably provided in feed line 34.

Check valve means 20 is connected to hydraulic cylinder means 50 by means of a first check valve means feed line 28 connecting check valve 22 to an opening 54 in outer housing 52 of hydraulic cylinder means 50 and a second check valve means feed line 30, 32 connecting check valve 24 to an opening 56 provided in housing 52. A filter valve 40 is provided in the second check valve means feed line 30, 32.

The hydraulic cylinder means 50 of the present invention includes an outer housing 52 and an annular inner liner 58. Liner 58 is provided within housing 52 in a manner so that an annular space between the outer housing 52 and the outer wall of the inner liner 58 is provided to create a passageway 60 to allow fluid to pass into and out of the inner liner 58 to and from line 32.

Outer housing 52 is provided with a cylinder head 70 having an annular ridge 72 therein. Hydraulic cylinder means 50 is also provided with a piston means 80 having a piston rod 82 and piston head 84 adapted for reciprocal motion within the inner lining 58. Piston head 84 may be provided with one or more impact relief valves. Impact relief valves 86 and 88 are provided about a circle having a diameter equal to the diameter of the ridge 72 provided in cylinder head 70. In this manner, when the piston head 84 reaches the top of its stroke (to the right as shown in the Figure) the impact relief valves 86 and 88 will each contact the annular ridge 72 in the cylinder head 70 and will be caused to be opened providing two passageways through the cylinder head 84 allowing for the passage of fluid therethrough. Impact relief valves 86 and 88 are each spring biased in a closed position and, accordingly, may be opened only upon contact with the annular ridge 72.

Figure 2:
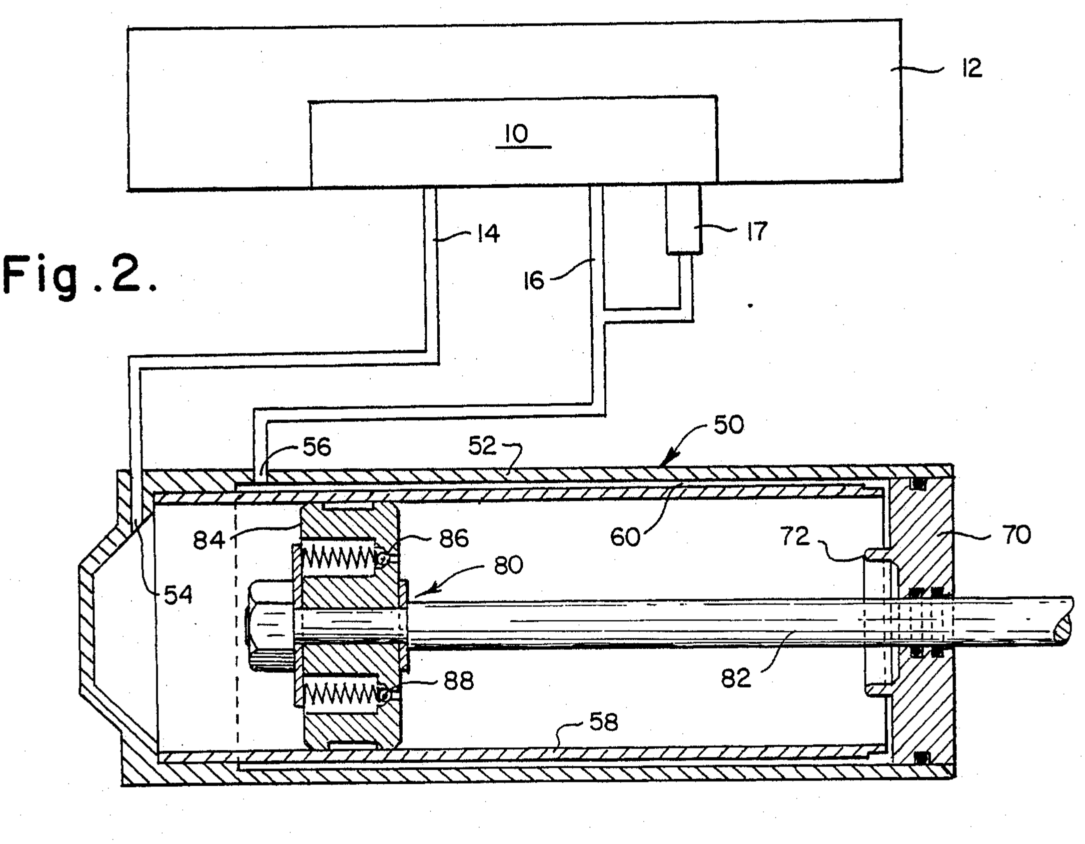
FIG. 2 is a schematic view of the impact relief valve and apparatus according to the present invention having no check valve means.

The circuit of FIG. 2 is identical to that of FIG. 1 except that it does not contain check valve means, a manual release nor a filter valve. Like components have the same reference numbers as in FIG. 1. It will be appreciated that the circuit of FIG. 2 illustrates the structure of the present invention in its simplest form.

The operation of the present invention will now be briefly described. When shuttle piston 26 is moved to the right, a passageway through check valve 24 is provided which allows fluid to pass from pump 10 through feed line 14 to feed line 28 into opening 54 of housing 52. Fluid entering the inner liner 58 below (to the left) of the piston head 84 causes the piston head to be moved upwardly (to the right). Once the piston head 84 reaches the top of its stroke, the impact relief valves 86 and 88 will be in contact with the annular ridge 72 and will be opened thereby. Any additional pressure entering the inner lining 58 from line 28 will then be directed through the annular passageway 60 into feed line 32 and will be directed back to pump 10 to act as supply oil. It will be obvious to those skilled in the art that the provision of impact relief valves 86 and 88 mechanically unloaded in the piston head 84 eliminates the need for a relief valve in line 14.

When the shuttle piston 26 of the check valve means 20 is moved to the left, a passageway is created through check valve 24 which allows fluid to pass from pump 10 through line 16 to lines 30, 32 into opening 56 of the housing 52. The fluid then passes upwardly through the annular passageway 60 and enters the inner lining 58 adjacent the cylinder head 70. Because the fluid enters the inner lining 58 above (to the right) the piston head 84, piston 84 is urged downwardly (to the left) completing the reciprocal cycle. Because impact relief valves are closed except when the piston head is at the top of its stroke, a separate pressure relief valve 17 is preferably provided in line 16.

In the foregoing Specification I have set out certain objects, purposes and advantages of the present invention. It is to be distinctly understood that the present invention is not limited thereto but may be otherwise variously practiced within the scope of the following claims.

I claim:

1. An impact relief valve and apparatus comprising:

(a) hydraulic pump means having first and second feed lines and a fluid reservoir; and (b) cylinder means connected to the feed lines, said cylinder means having an outer housing including a cylinder head provided at one end thereof, an annular cylinder liner provided within said housing creating an annular space between the liner and housing to create a passageway into the liner adjacent said cylinder head, piston means having a piston head provided within said liner and an attached piston rod extending through said cylinder head, said piston means adapted for reciprocal motion within said liner, said head having at least two impact relief valves therein positioned on a circle located inward from and concentric with an outer diameter of said piston head to provide piston head passageways through the piston head when said impact relief valves are in an open position, said cylinder head having an annular ridge positioned to contact and simultaneously open said at least two impact relief valves when said piston head reaches the top of its stroke and is adjacent said cylinder head, said cylinder housing having a first opening therethrough providing a passageway into said liner at an end opposite said cylinder head, and said cylinder having a second opening therethrough providing access to said passageway adjacent said cylinder head, said first feed line connected to said first opening and said second feed line connected to said second opening, whereby when fluid from said first line pushes the piston means to the top of its stroke, the at least two impact relief valves are caused to open allowing additional pressure from said first line to pass through the second line into the reservoir.

2. An impact relief valve and apparatus according to claim 1 further comprising check valve means provided in said pump feed lines, said check valve means having a shuttle piston and a first and second check valve to allow fluid to selectively flow from one of said first and second pump feed lines to said cylinder means.

3. An impact relief valve and apparatus according to claim 2 wherein said first check valve is connected to said reservoir by means of a thermal relief valve.

4. An impact relief valve and apparatus according to claim 2 wherein said first check valve is connected to a manual release valve.

5. An impact relief valve and apparatus according to claim 2 wherein a relief valve is provided in said second pump feed line.

* * * * *

UNITED STATES PATENT AND TRADEMARK OFFICE
CERTIFICATE OF CORRECTION

PATENT NO. : 4,825,752

DATED : May 2, 1989

INVENTOR(S) : VERNON A. KIFFMEYER

It is certified that error appears in the above-identified patent and that said Letters Patent is hereby corrected as shown below:

Column 2, line 15, change "ride" to --ridge--.

Signed and Sealed this

Twenty-first Day of November, 1989

*Attest:*

JEFFREY M. SAMUELS

*Attesting Officer* *Acting Commissioner of Patents and Trademarks*